United States Patent [19]

Mayer et al.

[11] Patent Number: 4,500,260
[45] Date of Patent: Feb. 19, 1985

[54] PRESSURE WAVE SUPERCHARGER WITH ROLLING BEARINGS FOR THE ROTOR

[75] Inventors: Andreas Mayer, Niederrohrdorf; Adolf Niederer, Unterehrendingen, both of Switzerland

[73] Assignee: BBC Brown, Boveri & Company, Limited, Baden, Switzerland

[21] Appl. No.: 469,992

[22] Filed: Feb. 25, 1983

[30] Foreign Application Priority Data

Mar. 3, 1982 [CH] Switzerland .................... 1293/82

[51] Int. Cl.³ ............................................. F04F 11/00
[52] U.S. Cl. ..................................................... 417/64
[58] Field of Search .................... 417/64; 60/39.45 A; 123/559

[56] References Cited

U.S. PATENT DOCUMENTS

| 2,836,346 | 5/1958 | Jendrassik | 417/64 |
| 3,078,034 | 2/1963 | Spalding | 417/64 |
| 3,190,542 | 6/1965 | Vickery | 417/64 |
| 4,369,020 | 1/1983 | Rahnke | 417/64 |

Primary Examiner—Edward K. Look
Attorney, Agent, or Firm—Werner W. Kleeman

[57] ABSTRACT

The pressure wave supercharger with rolling bearings for the rotor shaft has ducts in the air casing connecting the shaft space with the air induction duct in order to cool the two ball bearings mainly subjected to heating effects and located in the rotor side part of the shaft space. The rolling bearing on the driving belt side is a needle bearing.

21 Claims, 13 Drawing Figures

PRESSURE WAVE SUPERCHARGER WITH ROLLING BEARINGS FOR THE ROTOR

BACKGROUND OF THE INVENTION

The present invention concerns a pressure wave supercharger with rolling bearings for the rotor according to the main concept of patent claim 1.

The rotors of pressure wave superchargers in practical use in internal combustion engines are all supported in sliding bearings. These sliding bearings are supplied with oil from the lubricating oil system of the engine. Because of the high rotational speed of the rotor, the bearings would be very rapidly destroyed by an interruption of the lubricating oil supply, for example because of a pipe failure, and this represents a danger to operating safety. Because of the substantially greater bearing friction compared with rolling bearings, the driving power is also higher and this leads to higher fuel consumption. Since the lubricating oil must not get into the rotor cells providing the pressure exchange between the induction air and the exhaust gas, contact seals are provided which, however, further increase the necessary driving power and also form a source of trouble. Such seals also have the task of keeping soot-laden exhaust gas, such as appears with diesel engines during idle, part load and changes in load, away from the bearings.

For accurate axial location of the rotor shaft relative to the air and gas casings, which is important for the maintenance of the smallest possible axial play between the rotor end surfaces and the end surfaces of the casings mentioned, sliding bearing systems must have a thrust bearing. In order to avoid jamming of the latter, a certain, relatively large thrust bearing play must be maintained, so that lower limits are set for the rotor play, already mentioned, from this source; it would be desirable to go below these limits in order to reduce the leakage losses.

The use of rolling bearings with permanent grease lubrication permits the reduction of the necessary driving power by more than half and the obviation of continuous oil lubrication excludes the danger of breakdowns due to interruptions in the oil supply. In addition, rolling bearings are characterized by high load carrying capacity and the axial bearing play can be compensated by spring prestressing without, in contrast to sliding bearings, the bearing friction being substantially increased in the process. An economic advantage of rolling bearings is provided by the low manufacturing costs because of the obviation of the elements for continuous oil lubrication and due to the permanent lubrication, which markedly reduces the maintenance costs.

Rolling bearings for pressure wave superchargers have therefore already been proposed, inter alia in Swiss Patent Specification Nos. 349,448, 351,141, 398,185 and 452,280. These bearing systems mainly use voluminous self-aligning roller bearings as the fixed bearing, straight roller bearings being used as well as self-aligning roller bearings as the floating bearing. All these proposals, however, lack measures, which are absolutely necessary, for obviating the danger of sooting of the lubricating grease, which arises due to the pressure difference between the air side hub region of the rotor and the shaft space. They also lack equipment for cooling the rolling bearings, in which substantial quantities of heat can accumulate because there is no longer any oil circulation; these heat accumulations must be removed to the greatest extent possible not only because of their damaging effects on the clearances in the bearing and in the rotor casing, but also in order to avoid a thermodynamic deterioration of the pressure wave process. Investigations have also shown that measures, which provide for a metered continuous supply of grease from the grease store into the bearing, are necessary and the patents mentioned make no provision to this end either.

SUMMARY OF THE INVENTION

The present invention, defined in the characterizing part of patent claim 1, arises from the object of developing a rolling bearing system for pressure wave superchargers, in which rolling bearing system the faults mentioned in the patents quoted are avoided, i.e. effective cooling and permanent lubrication of the bearings is specifically guaranteed and, in addition, the bearings also require less installation space, which is in the interest of compact dimensions for the supercharger.

BRIEF DESCRIPTION OF THE DRAWINGS

The invention is described in more detail in what follows, using illustrative embodiments and referring to the drawings. In these.

DETAILED DESCRIPTION OF THE PREFERRED EMBODIMENTS

Figure 1:
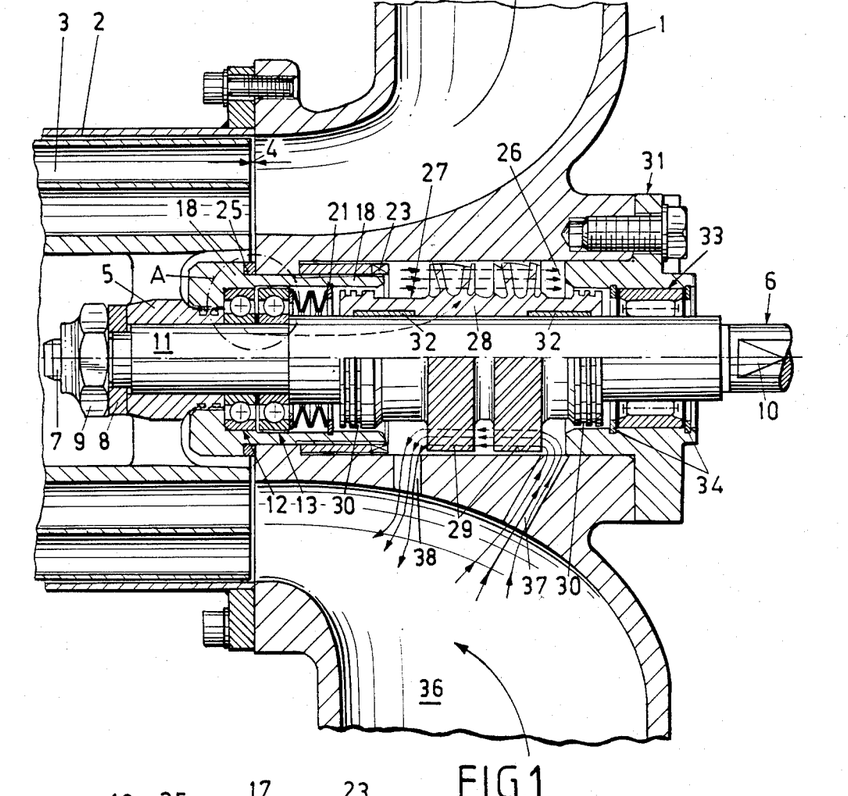
FIG. 1 shows a first embodiment of the rolling bearing system according to the invention with an air supply device for removing heat.

FIG. 1 shows the excerpt from a pressure wave supercharger containing the bearing system of the rotor shaft. It is located in the air casing 1. The casing shell 2 encloses the twin flow rotor 3 with small radial clearance. The axial clearance, indicated by 4, between the rotor end surface and the end surface of the air casing 1 should be kept as small as possible to reduce leakage loss in both steady operation and starting up, the objective in the latter case being to obtain the most rapid possible build-up of pressure. The rotor is fastened by its hub 5 to the inner end of the rotor shaft 6, a threaded bolt 7 screwed into the shaft 6, a washer 8 and a nut 9 being used for this purpose, and the hub 5 being axially braced by this means. The shaft 6 is provided with a flat 10 at its outer end, this flat preventing rotational slip of the V-belt pulley 63, not shown, which drives the shaft.

Figure 1A:
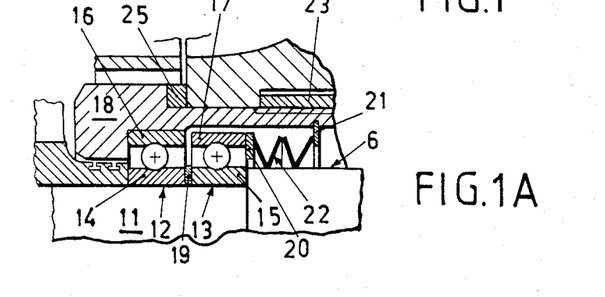
FIG. 1A shows a detail from FIG. 1 on a larger scale.

The fixed bearing system, for this see the magnified excerpt A in FIG. 1A, is formed by two grooved ball-bearings 12, 13, seated on a shaft seating 11 which also takes the rotor hub 5, the two inner rings 14 and 15 of the ball-bearings 12, 13 being held by the nut 9 via the rotor hub 5 against the shoulder of the shaft seating 11. The outer race 16 of the inner ball-bearing 12 sits firmly in a bearing sleeve 18, whilst the outer race 17 of the ball-bearing 13 has a clearance relative to the bore of this bearing sleeve 18. A distance washer 19 between the two bearings 12 and 13 separates the two outer races 16, 17, so that the shaft 6 can expand freely relative to the bearing sleeve 18. The fit between the bearing elements and, consequently, clearance compensation with varying temperatures is provided by a washer 20, which is in contact with the outer race 17 of the bearing 13, a spring ring 21, which sits in a groove of the bearing sleeve 18, and a column of plate springs 22 pressed between the washer 20 and the spring ring 21.

The bearing sleeve 18 is fixed in the air casing by a threaded ring 23 which is screwed onto an external thread of the bearing sleeve and braces a distance ring 25 against the housing 1. By appropriate dimensioning of the thickness of the distance ring 25, the rotor 3 can be so located, that the desired axial clearance between the end surfaces of the rotor and the air casing is attained.

The shaft 6 carries, in the central area of the shaft region 26, a fan sleeve 27 consisting of a hub part 28 and two fan rings 29. Both ends of the hub part are provided with labyrinth grooves 30, which form a throttling gap relative to the bore in the bearing sleeve 18 and a bore in a bearing flange 31. The fixing of the fan sleeve 27 is provided by two so-called tolerance rings 32; these are sheet metal sleeves with longitudinal tabs distributed around the periphery and are deformed during installation on the shaft and in the bore. The bearing flange 31 accepts a needle bearing 33 without an inner race, which serves as floating bearing and permits the free axial extension capability of the shaft 6. The extent to which the outer race of the needle bearing can be displaced longitudinally is limited, in a known manner, by two spring rings 34; the bearing needles run directly on the shaft 6.

At least one inlet duct 37 branches off the induction duct 36 of the air casing 1 into the shaft space 26 and at least one outlet duct 38 from the shaft space 26 issues into the induction duct 36. The duct 37 branches off a small part of the induction air for the purpose of cooling the bearings in the shaft space 26, the inflow being supported in addition to the dynamic pressure by the helically vaned fan rings 29. The heated air returns to the induction duct 36 via the duct 38. The fan rings 29 according to FIGS. 1 and 2 are embodied in the form of helical gears, which offer a larger heat exchange surface than straight toothed wheels which, however, are also basically suitable.

Further explanations of the measures referring to the permanent lubrication and the prevention of soot penetration into the bearings follow later.

Figure 2:
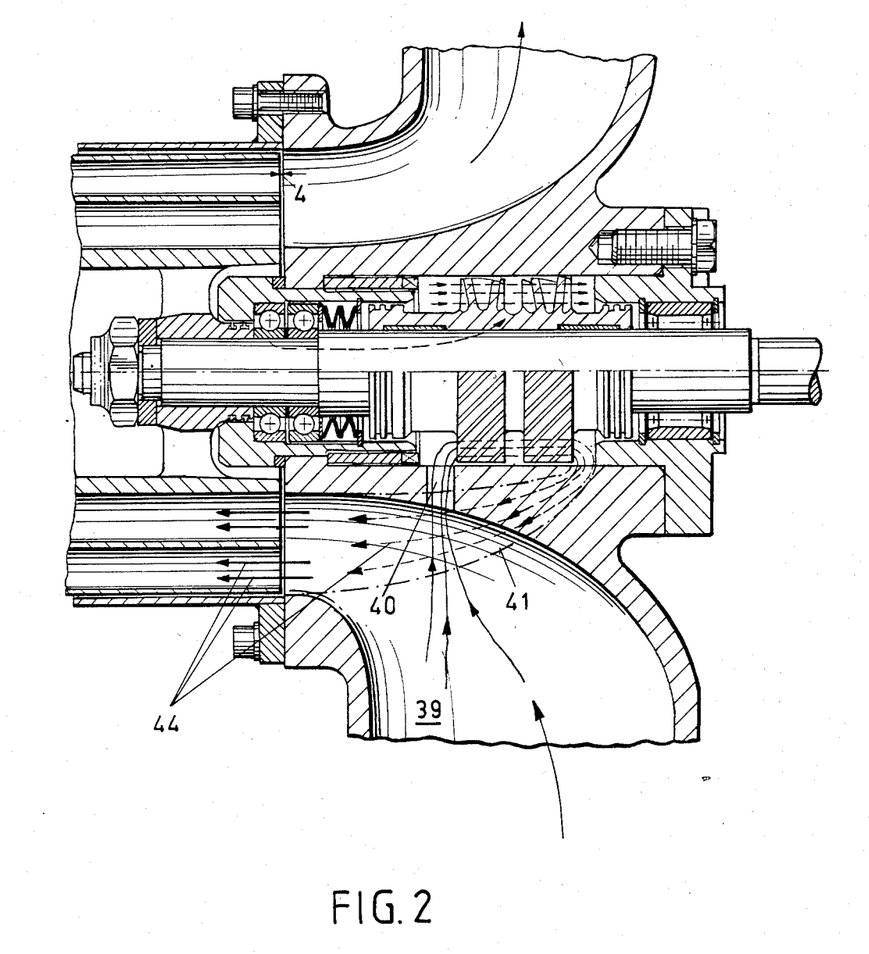
FIG. 2 shows a variant of the embodiment according to FIG. 1, wherein the pressure wave process is used for bearing cooling.
Figure 3:
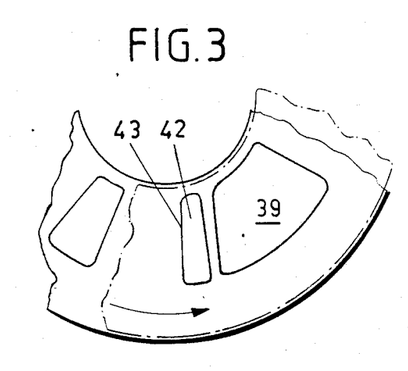
FIG. 3 shows a detail of the embodiment according to FIG. 2.

The embodiment according to FIG. 2 corresponds to the embodiment shown in FIG. 1 with respect to the bearing elements but differs from the latter, however, in having a more effective ventilating system for the shaft space. In this arrangement, the supply of induced air is again effected from the induction duct 39 via at least one inlet duct 40. The shaft space 26 is additionally connected with a slot shaped suction duct 41, whose contour is shown dash-dotted because it is located in a plane in front of the induction duct. It issues into the rotor space with the cross-section 42 drawn in FIG. 3. As soon as one of the generally radial cell walls of the rotor passes the opening edge 43 of the induction duct 41, a partial vacuum occurs in the latter because there is also a partial vacuum in the appropriate rotor cell, which causes the flow into the rotor cells indicated by the arrow 44.

Figure 4:
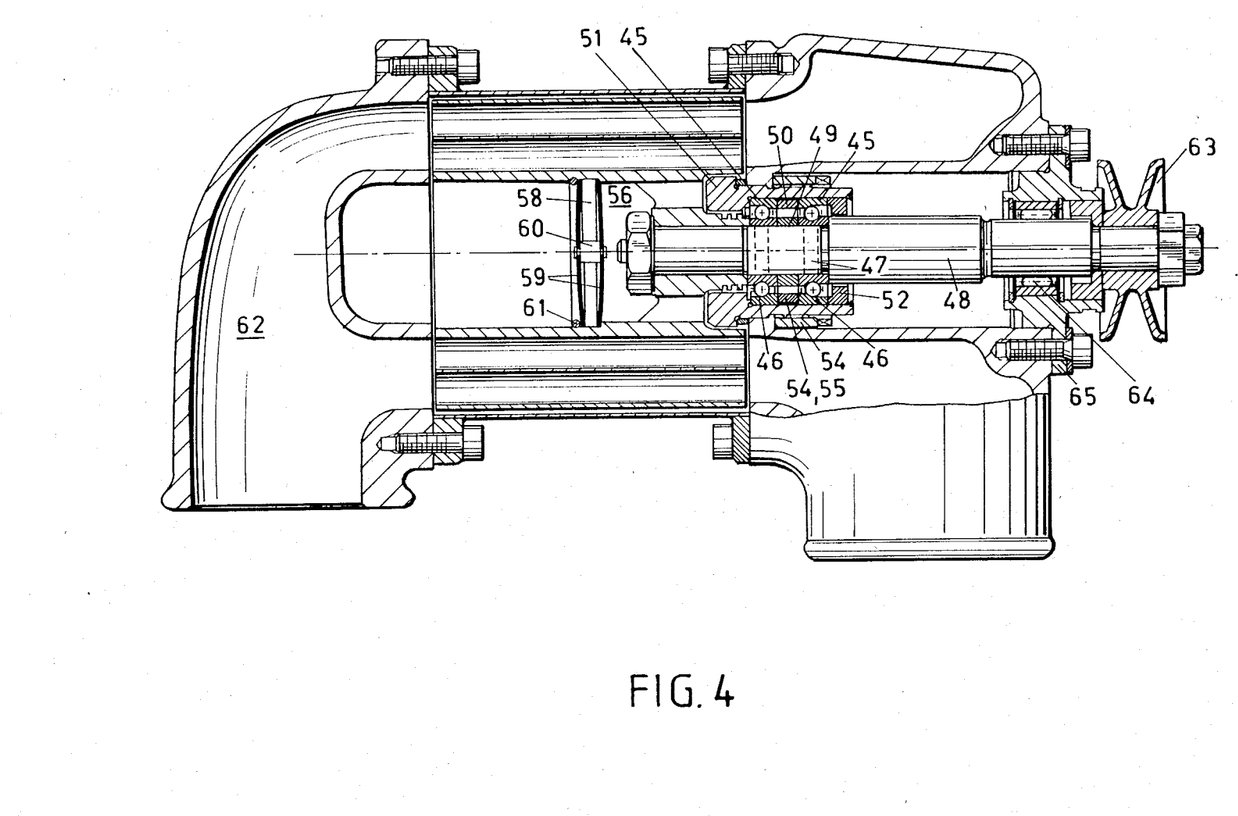
FIG. 4 shows a further variant of the subject of the invention.

The pressure wave supercharger shown in FIG. 4 differs from that shown in FIGS. 1 and 2 mainly by another embodiment of the ball-bearing system. The same means for ventilating the shaft space are employed as in the embodiment according to FIG. 1 or 2 but are not shown here.

Figure 5:
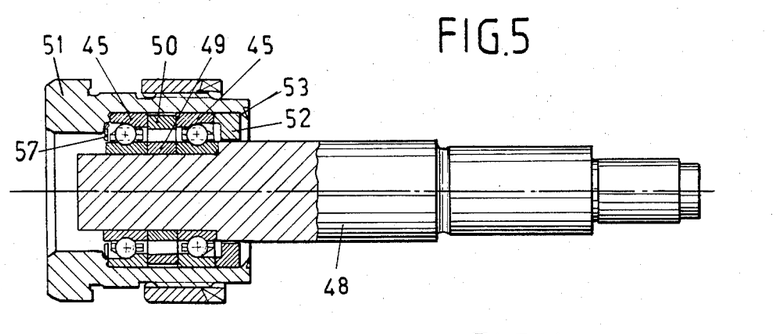
FIG. 5 shows a rotor shaft with the bearing arrangement according to FIG. 4.

The bearing system for this variant, which is shown in FIG. 5 on a larger scale, has two angular contact ball-bearings 45, which are capable of taking relatively large axial loads in addition to the transverse loads. The bearings 45 shown in FIG. 4 have inner races whereas bearings 46 without inner races are provided in an alternate embodiment shown in FIG. 5a, in which bearings the ball races run on ground running grooves 47 in the rotor shaft 48. The embodiment with an inner race of the bearing 45 has a distance ring 49 or 40 in each case between the two inner races and also between the two outer races; in the cold condition of the supercharger, these distance rings 40 and 49 are axially compressed between the inner races and outer races, respectively. Since the inner races of the bearings 45 heat up more in use than the outer races, they also expand more than the latter, leading to a change in the contact angle and thus an axial displacement of the races relative to one another. By the contact angle is meant the angle which the connecting line of the contact points of the balls with the two races makes with, for example, the shaft axis. In this manner, the axial clearance necessary for correct running and correct location of the rotor in the casing shell adjusts itself. The bearing 45 is axially secured in the bearing sleeve 51 by a retaining ring 52 which is fixed by a bead 53 at the inner edge of the right-hand end face of the bearing sleeve 51, see FIG. 5, or by caulking this end face at some points distributed around the periphery.

Figure 5A:
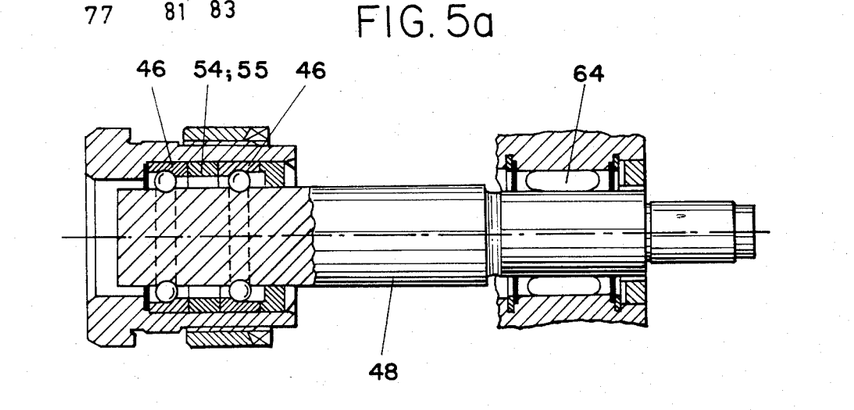
FIG. 5a shows a further embodiment of the rotor shaft analogous to FIG. 5.

The bearing system with complete angular contact ball-bearings, i.e. those with inner and outer rings, is shown in FIG. 5. FIG. 5a shows the bearing system with angular contact ball-bearings without inner races.

Figure 6:
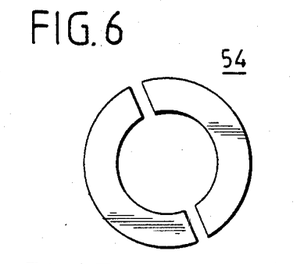
FIGS. 6 and 7 show details of the bearing arrangement according to FIG. 4.
Figure 7:
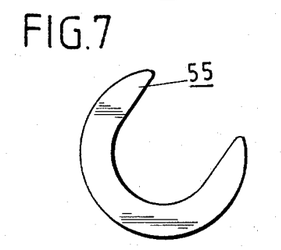

In the case of the angular contact ball-bearings without an inner race shown in FIG. 5a, it is not possible to prepare the bearing system for fitting separate from the shaft as a complete, ready-to-instal unit beaded into the bearing sleeve 51. In this case, it is necessary to fit one of the two bearings in a known manner to the shaft—pushing the ball race, with the balls which are movable radially outwards, onto the groove, pressing the balls radially inwards and pressing the outer race over them—the second outer race then being pushed over, the associated ball race fed into the running groove and the second outer ring pushed over the balls. The distance between the end faces of the outer rings facing one another then has to be measured and a split distance ring 54 according to FIG. 6 or a horseshoe shaped distance ring 55 according to FIG. 7 inserted, the width of the distance ring being equal to the measured distance apart. Only then can the bearing sleeve 51 be pushed over this assembly consisting of shaft and bearings and be fixed axially relative to it by means of a retaining ring 52 and a bead 53 of the bearing sleeve, mentioned above.

The bearing system is covered against the air side hub space 56 of the rotor by means of a sealing washer 57, which can be seen in FIG. 5, which is intended to prevent dirtying of the bearing by soot possibly getting into the air from the exhaust gas.

The bearing system is protected from heat radiation and dirt from the exhaust part of the rotor cells via the rotor hub by a cover 58 which has two sprung disks 59, preferably of sheet metal, riveted to a distance pin 60. The cover 58 is secured and held under axial pressure by a spring 61. The gas casing is indicated in FIG. 4 by 62.

A needle bearing similar to that for the embodiments according to FIGS. 1 and 2 can be used for the bearing system on the side of the V-belt pulley 63 as shown in FIG. 4, but it is possible to use needles 64 alone in order to economize in installation space, whereby, apart from a correspondingly finely machined shaft seating surface, which is also a requirement for the needle bearings mentioned above, this requires a hardened and ground bore in the bearing flange 65.

Figure 8:
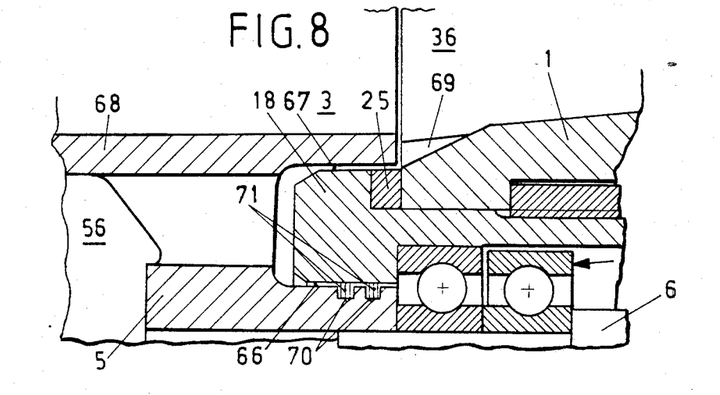
FIGS. 8 to 11 shows details of the system for protection against sooting according to the invention.
Figure 9:
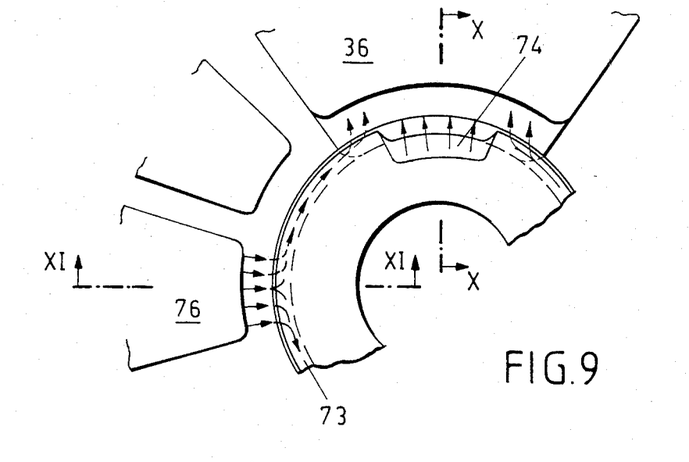
Figure 10:
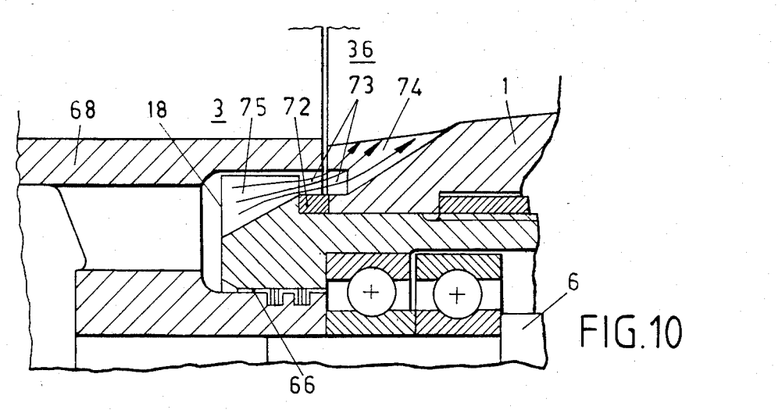
Figure 11:
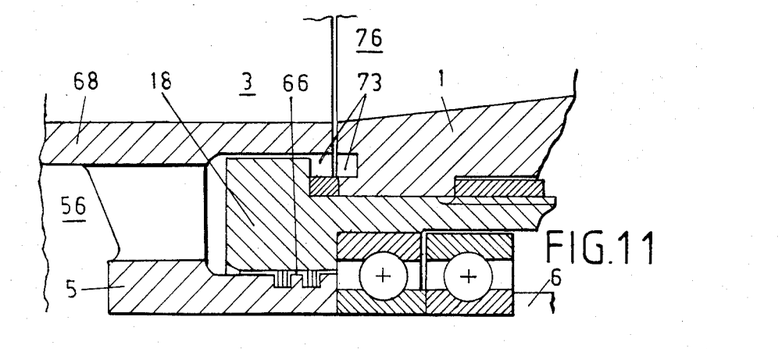

The measures by which the penetration of soot into the bearing system from unclean air out of the air casing is prevented consist in providing a connection of the shaft space 26 with the induction duct 36 of the air casing via the air side hub space of the rotor, as shown in FIG. 8, or a connection from the high pressure air duct 76 to the induction duct 36 is additionally provided in accordance with an embodiment shown in FIGS. 9-11.

In the embodiment according to FIG. 8, the shaft space has a passage connection with both induction ducts 36 via an inner annular space 66 between the rotor hub 5 and the bearing sleeve 18, the air side hub space 56, an external annular space 67 between the bearing sleeve 18 and the hub cylinder 68 of the rotor and a wide balancing slot 69 running obliquely downwards to the outer diameter of the distance ring 25 in the region of each of the induction ducts 36, in order to produce a suction out of the shaft space. As a physical hindrance to the penetration of soot particles into the shaft space, annular grooves 70 can be provided in the inner annular space 66 to take labyrinth rings 71. These are thin pieces of sheet metal wound helically with a narrow pitch, similar to keyrings, which spread out after they are installed to sit firmly in the bearing sleeve and so form a labyrinth.

FIGS. 9 to 11 show a modified embodiment of this system. FIG. 9 is a plan view of the high-pressure air and induction ducts, seen from the rotor, only one of the ducts being shown in each case, FIGS. 10 and 11 being sections, on a larger scale, corresponding to the section lines X—X and XI—XI drawn in FIG. 9. In this embodiment, the external annular space is extended, at the expense of the radial width of the distance ring 72, to an annular duct 73, which also extends into the air housing 1. In addition to the balance slots 74 in the region of the induction ducts 36, there are also some slots in the bearing sleeve 18, indicated by 75. The annular duct 73, which extends over the complete periphery, provides a connection to both high-pressure air ducts 76, from which a small flow passes over into the induction ducts 36. Possibly dirty high-pressure air, which could otherwise have got through the axial gap into the shaft space, is thus prevented from penetrating into the latter.

A further important advantage, which is obtained by means of the suction from the shaft space produced in this manner, consists of an automatic, small metered supply of lubricating grease from the grease store in the shaft space to the bearings, which achieves one of the objectives of this invention mentioned at the beginning.

Figure 12:
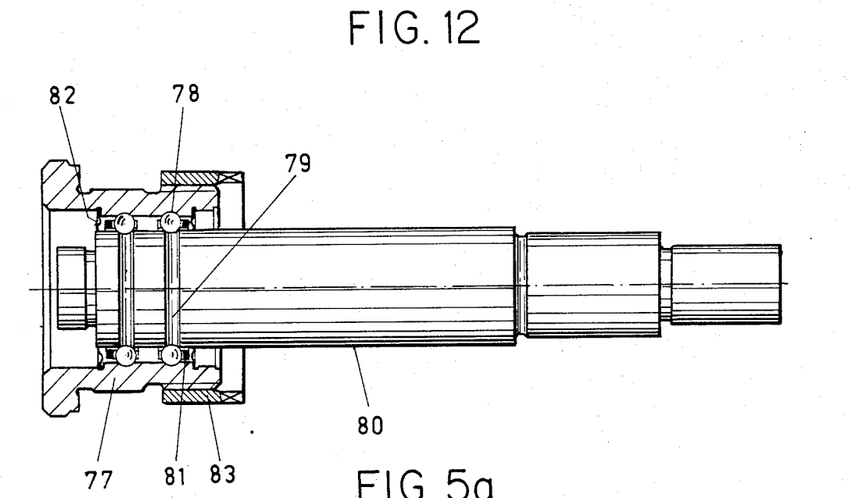
FIG. 12 shows a rotor shaft with a rolling bearing without inner and outer races.

A ball-bearing, which permits a particularly small shaft space and thus leads overall to a compact pressure wave supercharger, is shown in FIG. 12. In this bearing, a bearing sleeve 77 with ball race grooves serves as the ball-bearing outer race, whilst ball race grooves 79 on the shaft 80 replace the inner race. After the balls have been fed in between the shaft and the bearing sleeve in a known manner, the balls are separated by equal peripheral distances and fixed by snap cages 81 of high-temperature resistant, fiber-reinforced synthetic resin. Sealing washers 82 with small clearance relative to the shaft 80 close off a permanent grease filling against the exterior and a threaded ring 83 provides, as described above, axial fastening of the bearing sleeve 77 in the shaft space of the air casing.

List of terms

1 Air casing
2 Casing shell
3 Rotor
4 Axial clearance
5 Rotor hub
6 Rotor shaft
7 Threaded bolt
8 Washer
9 Nut
10 Flat
11 Shaft seat
12 Grooved ball-bearing
13 Grooved ball-bearing
14 Inner race of 12
15 Inner race of 13
16 Outer race of 12
17 Outer race of 13
18 Bearing sleeve
19 Distance washer
20 Washer
21 Spring ring
22 Column of plate springs
23 Threaded ring
25 Distance ring
26 Shaft space
27 Fan sleeve
28 Hub part of 27
29 Fan ring
30 Labyrinth grooves
31 Bearing flange
32 Tolerance rings
33 Needle bearing
34 Spring rings
36 Induction duct
37 Inlet duct
38 Outlet duct
39 Induction duct
40 Inlet duct
41 Suction duct
42 Cross section of 41
43 Opening edge of 42
44 Flow arrows
45 Angular contact ball-bearing with inner race
46 Angular contact ball-bearing without inner race
47 Race grooves for 46

48 Rotor shaft
49 Inner distance ring
50 Outer disstance ring
51 Bearing sleeve
52 Retaining ring
53 Bead
54 Split distance ring
55 Horseshoe-shaped distance ring
56 Air side hub space
57 Sealing washer
58 Cover
59 Disk
60 Distance pin
61 Spring ring
62 Gas casing
63 V-belt pulley
64 Needles
65 Bearing flange
66 Inner annular space
67 Outer annular space
68 Hub cylinder
69 Balance slot
70 Annular groove
71 Labyrinth rings
72 Distance ring
73 Annular duct
74 Balance slots
75 Balance slots
76 High-pressure air duct
77 Bearing sleeve with ball race grooves
78 Ball race grooves in 77
79 Ball race grooves on 80
80 Shaft
81 Snap cage
82 Sealing washers
83 Threaded ring

We claim:

1. A pressure-wave supercharger, comprising:
a rotor casing having a first end face and a second end face;
a rotor arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
a shaft space and a rolling bearing system included in said air casing for accommodating said rotor shaft;
duct means interconnecting said shaft space with said air induction ducts;
said duct means comprising, for each air induction duct of said air induction ducts, both an inlet duct at a front position of said air induction duct and an outlet duct lying behind said inlet duct, looking in the flow direction of the induction air;
said outlet duct issuing into said air induction duct just in front of an entry position of the induction air into said rotor;
said rolling bearing system including a first ball-bearing situated closer to said rotor, a second ball-bearing situated further away from said rotor and a bearing sleeve rigidly fixed in said air casing;
said first ball-bearing being equipped with a first outer ring and said second ball-bearing being equipped with a second outer ring;
said first outer ring sitting firmly in said bearing sleeve; and
said second outer ring sitting in said bearing sleeve so that it can be displaced axially.

2. A pressure-wave supercharger, comprising:
a rotor casing having a first end face and a second end face and including a rotor space;
a rotor arranged within said rotor space of said rotor casing and having a rotational direction;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;
said duct means comprising for each air induction duct of said air induction ducts, both an inlet duct between said air induction duct and said shaft space and a suction duct between said shaft and said rotor casing; and
said suction duct issuing at a point in said rotor space which, seen in said rotational direction of said rotor, lies immediately in front of a point of issue of said air induction duct into said rotor space.

3. A pressure-wave supercharger, comprising:
a rotor casing having a first end face and a second end face;
a rotor arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;
a part of the induction air flowing through said shaft space with a predetermined flow velocity; and
a fan sleeve with two fan rings sitting on said rotor shaft for increasing said predetermined flow velocity.

4. A pressure-wave supercharger, comprising:
a rotor casing having a first end face and a second end face;
a rotor having a cylindrical rotor hub and arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;

said rolling bearing system including a bearing sleeve rigidly fixed in said air casing;

said duct means comprising:
- an inner annular space between said rotor hub and said bearing sleeve;
- an air-side hub space contained within said rotor hub;
- an outer annular space;
- balance slots in said bearing sleeve; and
- balance slots in said air casing.

5. The pressure wave supercharger as claimed in claim 4, wherein the high pressure air ducts are in connection with the air induction ducts via the annular duct.

6. A pressure-wave supercharger, comprising:
a rotor casing having a first end face and a second end face;
a rotor arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;
said rolling bearing system including a first ball-bearing situated closer to said rotor, a second ball-bearing situated further away from said rotor, a distance ring, spring means and a bearing sleeve;
said first ball-bearing being equipped with a first inner race and a first outer race and said second ball-bearing being equipped with a second inner race and a second outer race;
said first inner race and said second inner race being seated with a fixed seat on said rotor shaft and being separated axially from one another by said distance ring;
said first outer race being seated with a fixed seat in said bearing sleeve;
said second outer race having a clearance relative to said bearing sleeve; and
said second outer race being loaded in the axial direction by said spring means.

7. A pressure-wave supercharger, comprising:
a rotor casing having a first end face and a second end face;
a rotor arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;
said rolling bearing system including a first angular-contact ball-bearing having a first inner race and a first outer race, a second angular-contact ball-bearing having a second inner race and a second outer race, a bearing sleeve, an inner distance ring, an outer distance ring, a retaining ring and a bead formed on said bearing sleeve;
said first and second outer races being seated with a fixed seat in said bearing sleeve;
said first and second inner races being kept at a distance from one another by said inner distance ring;
said first and second outer races being kept at a distance from one another by said outer distance ring; and
said first and second angular-contact ball-bearings being secured axially in said bearing sleeve by said retaining ring and said bead on said bearing sleeve.

8. A pressure-wave supercharger, comprising:
a rotor casing having a first end face and a second end face;
a rotor arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;
said rolling bearing system including two angular-contact, inwardly raceless ball-bearings, an outer distance ring, a retaining ring, a bearing sleeve and a bead formed on said bearing sleeve;
said two angular-contact ball-bearings being kept at a distance from one another by said outer distance ring; and
said two angular-contact ball-bearings being secured axially in said bearing sleeve by said retaining ring and said bead on said bearing sleeve.

9. A pressure-wave supercharger, comprising:
a rotor casing having a first end face and a second end face;
a rotor arranged within said rotor casing;
an air casing closing said first end face of said rotor casing and including air induction ducts through which flows induction air and high-pressure discharge ducts;
an exhaust gas casing closing said second end face of said rotor casing and including high-pressure gas supply ducts and low-pressure gas exhaust ducts;
a rotor shaft upon which said rotor is mounted;
said air casing including a shaft space and a rolling bearing system for accommodating said rotor shaft;
duct means interconnecting said shaft space with said air induction ducts;
said rolling bearing system including bearing balls and snap cages for fixing said bearing balls;
said snap cages separating said bearing balls from one another in two rows;
said rotor shaft being provided with inner race grooves for said two rows of bearing balls; and
said bearing sleeve being provided with outer race grooves for said two rows of bearing balls.

10. A pressure-wave supercharger, comprising:
a rotor casing having a first end face and a second end face;
a rotor having a rotor hub and arranged within said rotor casing;

an air casing closing said first end face of said rotor casing and including air induction ducts through which flows induction air and high-pressure discharge ducts;

an exhaust gas casing closing said second end face of said rotor casing and including high-pressure gas supply ducts and low-pressure gas exhaust ducts;

a rotor shaft upon which said rotor is mounted;

said air casing including a shaft space and a rolling bearing system for accommodating said rotor shaft;

duct means interconnecting said shaft space with said air induction ducts;

radiation and sooting protection means being provided within said rotor hub; and said radiation and sooting protection means consisting of a cover with two sprung sheet-metal discs and a distance pin together with a spring ring for securing said cover axially in said rotor hub.

11. A pressure-wave supercharger, comprising:

a rotor casing having a first end face and a second end face;

a rotor arranged within said rotor casing and having a rotor hub and a periphery;

a rotor shaft having a longitudinal direction of extent;

said rotor hub being fixedly attached to said rotor shaft;

said rotor including cell walls arranged at said periphery of said rotor;

an air casing closing said rotor casing at said first end face thereof;

a drive belt pulley fixedly attached to said rotor shaft outside said air casing;

said air casing including a shaft space and a rolling bearing system for accommodating said rotor shaft;

said rolling bearing system comprising a fixed bearing and a floating bearing;

said fixed bearing being situated in the vicinity of said rotor hub and comprising two rolling bearings;

said floating bearing being situated in the vicinity of said drive belt pulley and comprising a needle bearing;

said air casing including at least one air induction duct through which flows induction air and at least one high-pressure air duct;

a gas casing closing said second end face of said rotor casing;

said gas casing including a low-pressure gas duct and a high-pressure gas duct;

means for interconnecting said shaft space accommodating said rotor shaft with said air induction duct in said air casing;

a bearing sleeve rigidly fixed in said air casing in said longitudinal direction of extent of said rotor shaft;

said two rolling bearings comprising ball-bearings; and said ball-bearings being seated in said bearing sleeve.

12. The pressure-wave supercharger as defined in claim 11, further including:

duct means defining said means for interconnecting said shaft space with said air induction duct;

said duct means comprising an inlet duct and an outlet duct for each air induction duct of said at least one air induction duct;

said inlet duct being situated at a front region of said air induction duct;

said outlet duct being situated behind said inlet duct in a direction of flow of the induction air;

said outlet duct issuing into said air induction duct just before an entry position of the induction air into said rotor;

a first ball-bearing of said ball-bearings being arranged closer to said rotor;

a second ball-bearing of said ball-bearings being arranged closer to said drive belt pulley;

said first ball-bearing being fixedly seated at an outer race thereof in said bearing sleeve; and said second ball-bearing being axially translatably seated at an outer race thereof in said bearing sleeve.

13. The pressure-wave supercharger as defined in claim 11, further including:

duct means defining said means for interconnecting said shaft space with said air induction duct;

said duct means comprising an inlet duct and a suction duct for each air induction duct of said at least one air induction duct;

said inlet duct extending between said shaft space and said rotor casing;

said rotor casing defining a rotor cavity for accommodating said rotor;

said rotor having a direction of rotation; and said suction duct issuing into said rotor cavity at a point immediately in front of a point at which said air induction duct issues into said rotor cavity as seen in said direction of rotation of said rotor.

14. The pressure-wave supercharger as defined in claim 11, wherein:

a portion of the induction air flows through said shaft space with a predetermined flow velocity; and a fan sleeve having two fan rings seated upon said rotor shaft for increasing said predetermined flow velocity.

15. The pressure-wave supercharger as defined in claim 11, further including:

a hub tube;

duct means defining said means for interconnecting said shaft space with said at least one air induction duct;

said duct means comprising:

an inner annular space between said rotor hub and said bearing sleeve;

an air-side hub space wihtin said hub tube;

an outer annular space;

balance slots in said bearing sleeve; and balance slots in said air casing.

16. The pressure-wave supercharger as defined in claim 15, further including:

an annular duct for interconnecting said at least one high-pressure air duct with said at least one air induction duct.

17. The pressure-wave supercharger as defined in 11, further including:

a distance ring;

said ball-bearings defining said two rolling bearings of said fixed bearing;

said ball-bearings being fixedly seated at inner races thereof upon said rotor shaft;

said ball-bearings being mutually axially separated by said distance ring;

a first ball-bearing of said ball-bearings being arranged closer to said rotor;

said first ball-bearing being fixedly seated at an outer race thereof in said bearing sleeve;

a second ball-bearing of said ball-bearings possessing clearance of an outer race thereof in relation to said bearing sleeve; and said second ball-bearing being axially spring-loaded at said outer race thereof.

18. The pressure-wave supercharger as defined in claim 11, further including:

an inner distance ring;

a retaining ring;

a bead formed upon said bearing sleeve;

said fixed bearing comprising two angular-contact ball-bearings;

said two angular-contact ball-bearings being seated at outer races thereof in said bearing sleeve;

said two angular-contact ball-bearings being separated at inner races thereof by said distance ring;

said two angular-contact ball-bearings being separated at said outer races thereof by said outer distance ring; and said two angular-contact ball-bearings being axially retained in said bearing sleeve by said retaining ring and said bead on said bearing sleeve.

19. The pressure-wave supercharger as defined in claim 11, further including:

a distance ring;

a retaining ring;

a bead formed upon said bearing sleeve;

said fixed bearing comprising two angular-contact, inwardly raceless ball-bearings;

said rotor shaft comprising raceway grooves for bearing balls of said two angular-contact ball-bearings;

said two angular-contact ball-bearings being press-fitted at outer races thereof in said bearing sleeve;

said distance ring being provided between said two angular-contact ball-bearings at said outer races thereof; and said two angular-contact ball-bearings being axially retained in said bearing sleeve by said retaining ring and said bead on said bearing sleeve.

20. The pressure-wave supercharger as defined in 11, further including:

snap cages for retaining bearing balls;

said fixed bearing consisting of two rows of bearing balls; and said snap cages retaining said two rows of bearing balls and separating said two rows from one another.

21. The pressure-wave supercharger as defined in 11, further including:

radiation and sooting protection means provided within said rotor hub; and said radiation and sooting protection means comprising a cover having two sprung sheet-metal discs, a distance pin and a spring ring for axially securing said cover in said rotor hub.

* * * * *

UNITED STATES PATENT AND TRADEMARK OFFICE
CERTIFICATE OF CORRECTION

PATENT NO. : 4,500,260

DATED : February 19, 1985

INVENTOR(S) : ANDREAS MAYER et al

It is certified that error appears in the above-identified patent and that said Letters Patent is hereby corrected as shown below:

Column 4, line 54, after "shaft" delete "-"

Column 7, line 3, delete "disstance" and insert --distance--

Signed and Sealed this

Twenty-third Day of July 1985

[SEAL]

Attest:

DONALD J. QUIGG

*Attesting Officer*     *Acting Commissioner of Patents and Trademarks*